(12) United States Patent
Chu et al.

(10) Patent No.: US 12,658,506 B2
(45) Date of Patent: Jun. 16, 2026

(54) BATTERY TEMPERATURE CONTROL SYSTEM

(71) Applicant: Delta Electronics, Inc., Taoyuan City (TW)

(72) Inventors: Ching-Shun Chu, Taoyuan City (TW); Hsing-Fa Lin, Taoyuan City (TW)

(73) Assignee: Delta Electronics, Inc., Taoyuan City (TW)

( * ) Notice: Subject to any disclaimer, the term of this patent is extended or adjusted under 35 U.S.C. 154(b) by 917 days.

(21) Appl. No.: 17/869,457

(22) Filed: Jul. 20, 2022

(65) Prior Publication Data

US 2023/0299389 A1 Sep. 21, 2023

(30) Foreign Application Priority Data

Mar. 18, 2022 (CN) .......................... 202210271877.9

(51) Int. Cl.
*H01M 10/663* (2014.01)
*H01M 10/651* (2014.01)
*H01M 10/6563* (2014.01)

(52) U.S. Cl.
CPC ....... *H01M 10/663* (2015.04); *H01M 10/651* (2015.04); *H01M 10/6563* (2015.04)

(58) Field of Classification Search
CPC .............. H02J 2310/64; H02J 2310/14; H02J 13/00004; H02J 9/065; H01M 10/486; H01M 10/61; H01M 10/613; H01M 10/615; H01M 10/627; H01M 10/635; H01M 10/651; H01M 10/6563; H01M 10/663

USPC ................................................. 320/149–155
See application file for complete search history.

(56) References Cited

U.S. PATENT DOCUMENTS

| | | | |
|---|---|---|---|
| 9,781,864 B2 | 10/2017 | Yamaguchi et al. | |
| 2017/0115025 A1* | 4/2017 | Mowris | F24D 19/1087 |
| 2017/0240065 A1* | 8/2017 | Machida | B60L 1/003 |
| 2017/0365893 A1 | 12/2017 | Kim et al. | |

(Continued)

FOREIGN PATENT DOCUMENTS

| | | |
|---|---|---|
| CN | 103403993 A | 11/2013 |
| JP | 2009004319 A | 1/2009 |

(Continued)

*Primary Examiner* — Binh C Tat
(74) *Attorney, Agent, or Firm* — KIRTON McCONKIE; Evan R. Witt

(57) ABSTRACT

A battery temperature control system is disclosed. The battery temperature control system includes a cabinet, an air conditioner, a central control module and a plurality of battery modules. Each of the plurality of battery modules includes a plurality of batteries, a control unit, a fan assembly and a temperature detecting module, wherein the central control module sends a temperature controlling command to the air conditioner to activate a cold source or a heat source according to the ambient temperature, then the central control module compares and calculates a plurality of working temperature information transmitting from the plurality of battery modules, and sends a fan operation command to the each corresponding battery module, the corresponding fan assembly activates an working mode to cool or warm the temperature of the corresponding battery module, so as to adjust the working temperature of each battery module, and to achieve a dynamic temperature balance.

11 Claims, 8 Drawing Sheets

(56)                   References Cited

U.S. PATENT DOCUMENTS

| 2019/0184852 | A1* | 6/2019 | Takeuchi | ................ B60L 50/66 |
|---|---|---|---|---|
| 2021/0135174 | A1 | 5/2021 | Yang et al. | |
| 2021/0194076 | A1 | 6/2021 | Wang et al. | |

FOREIGN PATENT DOCUMENTS

| JP | 2012079553 | A | 4/2012 |
|---|---|---|---|
| JP | 2013120690 | A | 6/2013 |
| JP | 2014203536 | A | 10/2014 |
| JP | 2015191717 | A | 11/2015 |
| JP | 2020017358 | A | 1/2020 |
| TW | I469730 | B | 1/2015 |
| TW | 201816276 | A | 5/2018 |
| WO | 2017203985 | A1 | 11/2017 |

* cited by examiner

BATTERY TEMPERATURE CONTROL SYSTEM

CROSS-REFERENCE TO RELATED APPLICATION

This application claims priority to China Patent Application No. 202210271877.9, filed on Mar. 18, 2022. The entire contents of the above-mentioned applications are incorporated herein by reference for all purposes.

FIELD OF THE INVENTION

The present disclosure relates to a battery temperature control system, and more particularly to a battery temperature control system which can conduct a thermal management to each battery module, respectively.

BACKGROUND OF THE INVENTION

With the wide application of lithium batteries and the continuous improvement of the voltage requirements, the number of lithium batteries placed in a usual battery cabinet can easily exceed 200, or more. Such a huge number of lithium batteries makes it difficult to control the thermal management of these batteries. Generally speaking, a plurality of battery modules are arranged in a battery cabinet, and there are also a plurality of batteries arranged in series in each battery module, wherein these battery modules are thermally managed by an air conditioner.

The thermal management of the battery module mainly lies in how to enhance the temperature uniformity of the batteries. In the prior art, the reasons for the uneven temperature of the batteries include the batteries are produced from different production batches, the different impedance of the batteries themselves, the placement location of the battery module (high or low in the battery cabinet), the uneven internal wind field and the difference between the high or low temperature of the external environment and the sunlit surface, etc. In addition, since the heat generation of each battery is also dynamic, it may generate different amounts of heat according to different currents or times. These factors make the thermal management of the battery modules more difficult, and are hard to handle. Especially, when many battery modules are disposed in the battery cabinet at the same time, it is even more difficult to conduct the thermal management the individual battery modules one by one.

In the prior art, outdoor battery energy storage cabinets often use an air conditioner for cooling, so that the ambient temperature within the battery cabinet is maintained at 20-30 degrees to avoid overheating of the batteries. However, the ambient temperature is not equal to the battery temperature, and the battery is often wrapped in a complex battery module structure. If the temperature in the cabinet is locally high or low, and the battery module is disposed at the location of local high or low temperature, the battery temperature thereof may be too high or too low. Moreover, if the temperature of a single battery is too high or too low, and exceeds its predetermined protection value, the battery module may suspend operation due to perform the protection of the single battery, so that other batteries with normal temperature in the same battery module will not be able to operate, which may result in a loss of total electrical capacity.

In addition, the uneven temperature of the batteries of the prior art may also indirectly affect the service life of the batteries. Namely, it is important that how to enhance the temperature uniformity of the battery modules in the battery cabinet. Therefore, there is a need of providing battery temperature control system to obviate the drawbacks encountered from the prior arts.

SUMMARY OF THE INVENTION

It is an object of the present disclosure to provide a battery temperature control system, which can provide a cold source or a heat source for a plurality of battery modules, and can also conduct a thermal management to each battery module, respectively. It can effectively target the battery modules that deviate from the average, so as to cool down or heat up the deviated battery modules. Consequently, the working temperature of each battery module is adjusted, the temperature uniformity of the battery modules is improved, the service life of the batteries is prolonged, and the reliability of the product is improved.

In accordance with an aspect of the present disclosure, there is provided a battery temperature control system including a cabinet, an air conditioner, a central control module and a plurality of battery modules. The air conditioner is disposed in the cabinet for providing a cold source or a heat source. The central control module is disposed in the cabinet and coupled with the air conditioner. The plurality of battery modules are coupled with the central control module, wherein each of the plurality of battery modules includes a plurality of batteries, a control unit, a fan assembly and a temperature detecting module. The plurality of batteries, the fan assembly and the temperature detecting module are coupled with the control unit. Each battery module is constructed in a case, and the case is received in the cabinet. The temperature detecting module of each battery module detects and monitors a working temperature of the corresponding battery module continuously, and sends a working temperature information to the central control module. The central control module sends a temperature controlling command to the air conditioner to activate the cold source or the heat source according to an ambient temperature. Then the central control module compares and calculates the working temperature information transmitted from the plurality of battery modules, and sends a fan operation command to the corresponding battery module. The corresponding fan assembly activates an operation mode to cool down or heat up the corresponding battery module, so as to adjust the working temperature of each battery module to achieve a dynamic temperature balance.

In an embodiment, the air conditioner includes a cooling module and a heating module for respectively providing the cold source and the heat source, and outputting a cold air and a hot air.

In an embodiment, the temperature controlling command includes a first temperature controlling command and a second temperature controlling command. When the ambient temperature is determined as in a high temperature state, the central control module sends the first temperature controlling command to the air conditioner to activate the cooling module, so as to provide the cold source and output the cold air. When the ambient temperature is determined as in a low temperature state, the central control module sends the second temperature controlling command to the air conditioner to activate the heating module, so as to provide the heat source and output the hot air.

In an embodiment, the working temperature of each battery module is a first average temperature of the plurality of batteries of the battery module.

In an embodiment, the central control module calculates and compares the plurality of working temperature information transmitted from the plurality of battery modules with a reference temperature to calculate a deviation value of each battery module, and sends the fan operation command to the each corresponding battery module according to a working mode of the air conditioner and whether the deviation value exceeds a predetermined value, so that the fan assembly activates the operation mode to cool down or heat up the corresponding battery module to adjust the working temperature of each battery module.

In an embodiment, the reference temperature is a second average temperature of the plurality of battery module.

In an embodiment, the fan operation command includes a high-speed operation command, a medium-speed operation command and a low-speed operation command.

In an embodiment, the operation mode of the fan assembly includes a high-speed operation mode, a medium-speed operation mode and a low-speed operation mode. When the control unit of the battery module receives and sends the high-speed operation command, the medium-speed operation command or the low-speed operation command to the fan assembly, the fan assembly can correspondingly activate the high-speed operation mode, the medium-speed operation mode, or the low-speed operation mode.

In an embodiment, when the working mode of the air conditioner is a cooling mode, and the deviation value is a positive number and higher than the predetermined value, the central control module will transmit the high-speed operation command to the corresponding battery module, and the fan assembly will correspondingly activate the high-speed operation mode, so as to cool down the plurality of batteries of the battery module to reduce the working temperature of the battery module.

In an embodiment, when the working mode of the air conditioner is a cooling mode, and the deviation value is a negative number and higher than the predetermined value, the central control module will transmit the low-speed operation command to the corresponding battery module, and the fan assembly will correspondingly activate the low-speed operation mode, so as to decrease the cooling efficiency.

In an embodiment, when the deviation value is lower than the predetermined value, the central control module will transmit the medium-speed operation command to the corresponding battery module, and the fan assembly will correspondingly activate the medium-speed operation mode, so as to maintain the working temperature of the battery module.

In an embodiment, when the working mode of the air conditioner is a heating mode, and the deviation value is a positive number and higher than the predetermined value, the central control module will transmit the low-speed operation command to the corresponding battery module, and the fan assembly will correspondingly activate the low-speed operation mode, so as to decrease the heating efficiency.

In an embodiment, when the working mode of the air conditioner is a heating mode, and the deviation value is a negative number and higher than the predetermined value, the central control module will transmit the high-speed operation command to the corresponding battery module, and the fan assembly will correspondingly activate the high-speed operation mode, so as to heat up the plurality of batteries of the battery module to increase the working temperature of the battery module.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
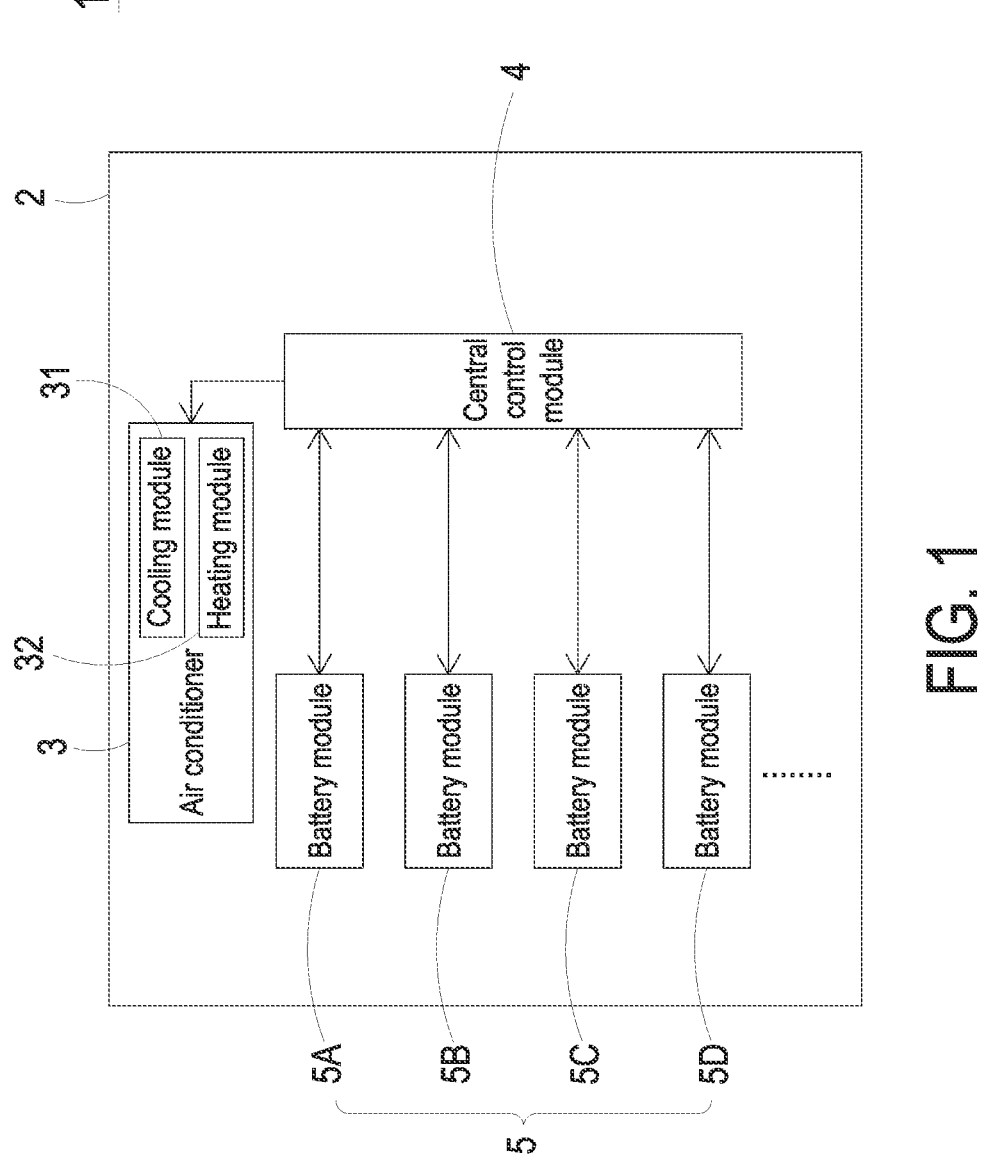
FIG. 1 is a block diagram illustrating a battery temperature control system according to an embodiment of the present disclosure.
Figure 2:
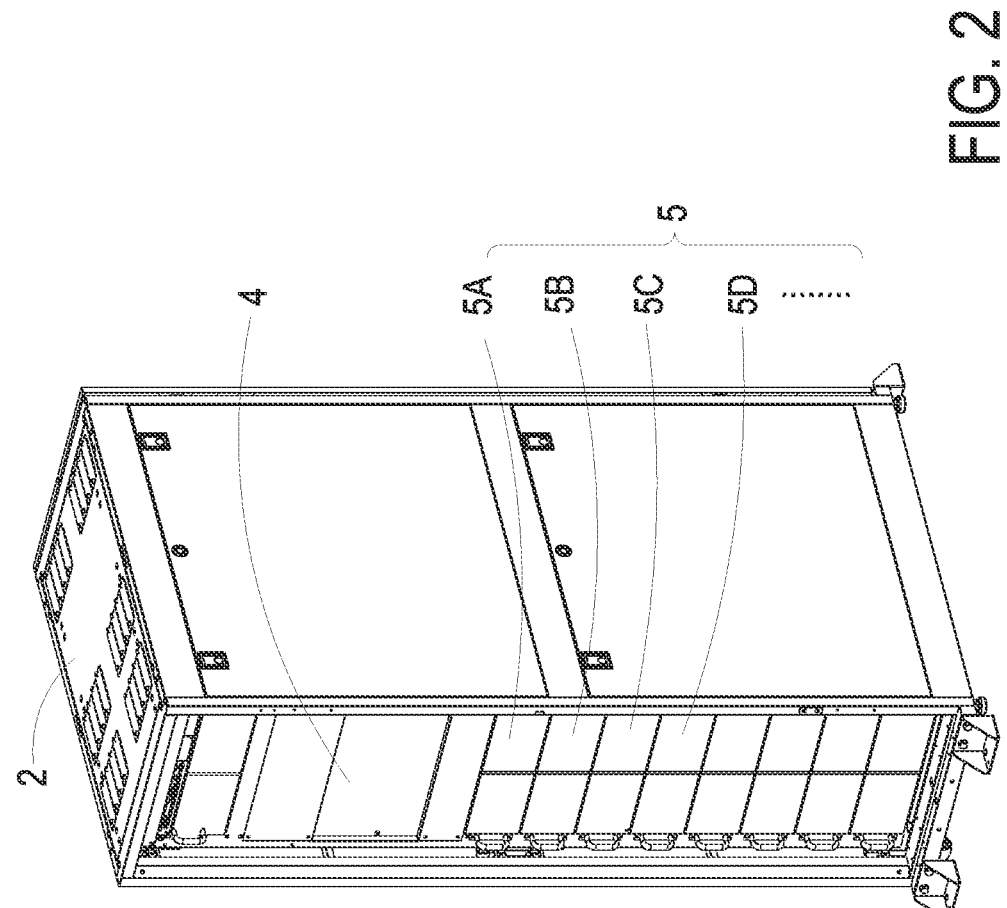
FIG. 2 is a schematic perspective view illustrating a cabinet of the battery temperature control system of FIG. 1.
Figure 3:
FIG. 3 is a block diagram illustrating a central control module of the battery temperature control system of FIG. 1.
Figure 3:
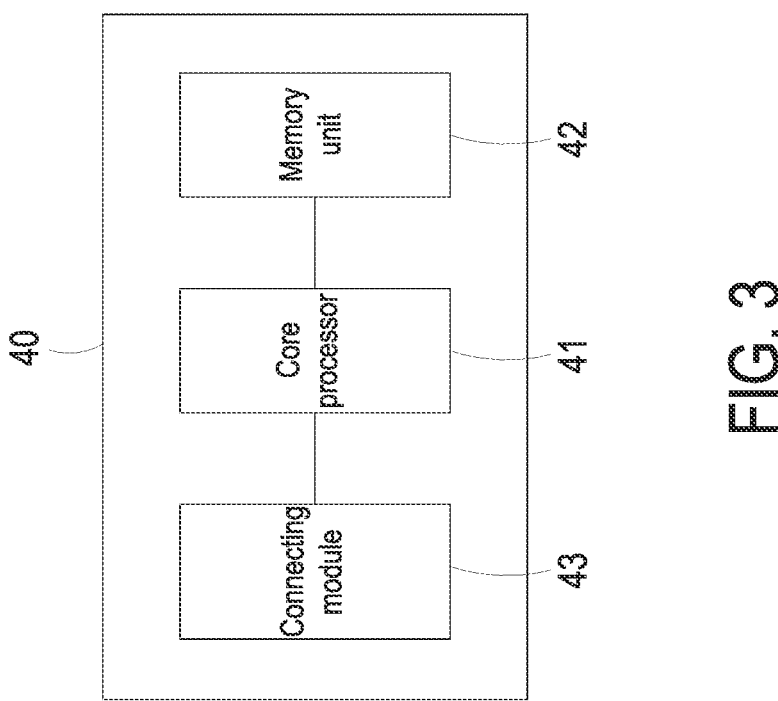
Figure 4:
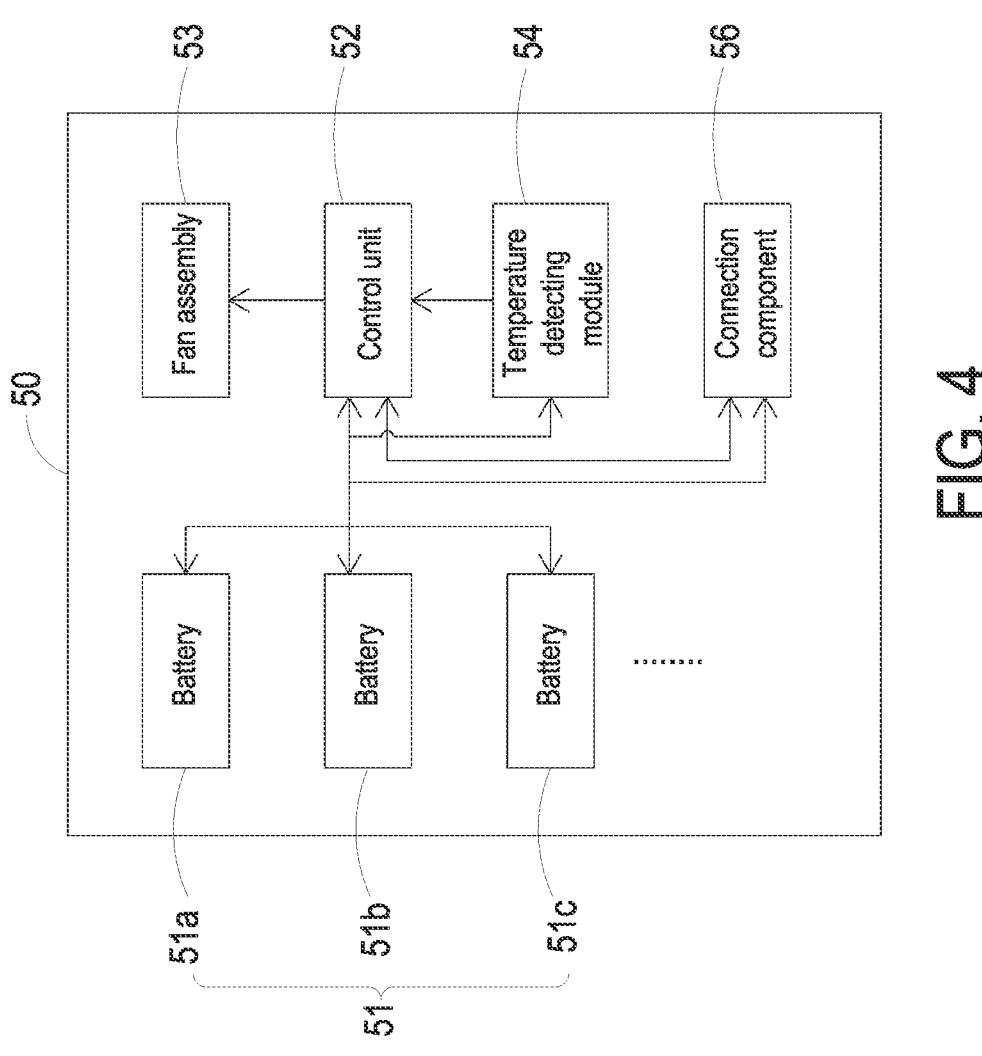
FIG. 4 is a block diagram illustrating a battery module of the battery temperature control system of FIG. 1.

FIG. 1 is a block diagram illustrating a battery temperature control system according to an embodiment of the present disclosure. FIG. 2 is a schematic perspective view illustrating a cabinet of the battery temperature control system of FIG. 1. FIG. 3 is a block diagram illustrating a central control module of the battery temperature control system of FIG. 1. FIG. 4 is a block diagram illustrating a battery module of the battery temperature control system of FIG. 1. As shown in FIG. 1 and FIG. 2, the battery temperature control system 1 includes a cabinet 2, an air conditioner 3, a central control module 4 and a plurality of battery module 5. The air conditioner 3 is disposed in the cabinet 2, and includes a cooling module 31 and a heating module 32 so as to provide a cold source and a heat source, respectively. The central control module 4 is disposed in the cabinet 2 and couples with the air conditioner 3. The plurality of battery modules 5 are coupled with the central control module 4. As shown on FIG. 4, each of the plurality of battery modules 5 includes a plurality of batteries 51, a control unit 52, a fan assembly 53 and a temperature detecting module 54, wherein the plurality of batteries 51, the fan assembly 53 and the temperature detecting module 54 are coupled with the control unit 52, and each battery module 5 is constructed in a case 50, the case 50 is received in the cabinet 2. The temperature detecting module 54 of each battery module 5 detects and monitors a working temperature of the corresponding battery module 5 continuously, and sends a working temperature information to the central control module 4. In the embodiment, the central control module 4 sends a temperature controlling command to the air conditioner 3 to activate the cold source or the heat source according to an ambient temperature, then the central control module 4 compares and calculates the working temperature information transmitted from the plurality of battery modules 5, and sends a fan operation command to the corresponding battery module 5. The fan assembly 53 of the corresponding battery module 5 activates an operation mode to cool down or heat up the corresponding battery module 5, so as to adjust the working temperature of each battery module 5 to achieve a dynamic temperature balance.

Please refer to FIG. 1, FIG. 2 and FIG. 3 again. In this embodiment, the air conditioner 3, the central control module 4 and the plurality of battery modules 5 are all disposed within the cabinet 2. As shown in FIG. 2, the cabinet 2 is a large cabinet, taking this embodiment as an example, the plurality of battery modules 5A, 5B, 5C, 5D . . . are arranged side by side, and the number is 18. It is noted that the arrangement and number are not limited thereto and are adjustable according to the practical requirements. In the embodiment, the air conditioner 3 is placed in the front side of the cabinet 2. In one embodiment, the air conditioner 3 may be hung on the door of the cabinet 2, but not limited to. In another embodiment, the air conditioner 3 may be disposed in the rare side of the cabinet 2 or disposed out of the cabinet 2. It is noted that the disposed position and number of the air conditioner 3 are not limited thereto and are adjustable according the practical requirements. In some embodiments, the air conditioner 3 can be a generally commercially available air conditioner, wherein the controller, the temperature sensor and the connector thereof are omitted here, which is mainly used for providing the cold source or the heat source of the battery temperature control system 1, therefore the types of the temperature adjustment device are not limited thereto. In the embodiment, as shown in FIG. 1, the air conditioner 3 includes the cooling module 31 and the heating module 32 at the same time, so that it can be chosen to provide the cold source or the heat source according to the temperature controlling command transmitted from the central control module 4, and then output cold air or hot air, respectively.

As shown in FIG. 2, the central control module 4 is stacked on the plurality of battery modules 5, but the position is not limited thereto. Moreover, as shown in FIG. 3, the central control module 4 includes a main board 40, a core processor 41, a memory unit 42, and a connecting module 43, wherein the core processor 41, the memory unit 42, and the connecting module 43 are electrically coupled with each other, and are disposed on the main board 40. The memory unit 42 is configured for storing reference temperature information. The connecting module 43 includes a plurality of connectors (not shown) for coupling with the air conditioner 3 and the plurality of battery modules 5 correspondingly. In some embodiments, the central control module 4 further includes at least one temperature sensor (not shown) for detecting the ambient temperature inside the cabinet 2, and sending the ambient temperature information to the core processor 41. In other embodiments, the ambient temperature inside the cabinet 2 may be calculated from the plurality working temperature information of the plurality of battery modules 5, but not limited to.

In the embodiment, the core processor 41 is configured for receiving, comparing and calculating information, determining and then outputting the corresponding commend. In other words, when the core processor 41 receives the ambient temperature information, the core processor 41 evaluates, determines and sends a corresponding temperature controlling command to the air conditioner 3 through the connecting module 43, so that the air conditioner 3 can activate the corresponding working mode, for example, cooling mode or heating mode, to output cold air or hot air to adjust temperature, so as to achieve a dynamic temperature balance inside the cabinet 2. In the embodiment, the temperature controlling command includes a first temperature controlling command and a second temperature controlling command. When the ambient temperature is determined as in a high temperature state, the core processor 41 of the central control module 4 sends the first temperature controlling command to the air conditioner 3. The first temperature controlling command is to activate the cooling module 31 of the air conditioner 3, so as to provide the cold source and output cold air. Consequently, the plurality of battery modules 5 disposed inside the cabinet 2 can inhale the cold air to cool down. On the contrary, when the ambient temperature is determined as in a low temperature state, the core processor 41 of the central control module 4 sends the second temperature controlling command to the air conditioner 3 to activate the heating module 32 of the air conditioner 3, so as to provide the heat source and output hot air. Consequently, the plurality of battery modules 5 disposed inside the cabinet 2 can inhale the hot air to heat up. Besides, the core processor 41 also sends a fan operation command to the corresponding battery module 5 through the connecting module 43 according to the working mode of the air conditioner 3 and whether the deviation value exceeds a predetermined value, so that the fan assembly 53 activates the operation mode to cool down or heat up the plurality of batteries 51 to adjust the working temperature of the corresponding battery module 5. In the embodiment, the fan operation command includes a high-speed operation command, a medium-speed operation command and a low-speed operation command, wherein the fan assembly 53 of each battery module 5 can correspondingly activate a high-speed operation mode, a medium-speed operation mode, and a low-speed operation mode according to the high-speed operation command, the medium-speed operation command and the low-speed operation command, respectively.

Figure 5:
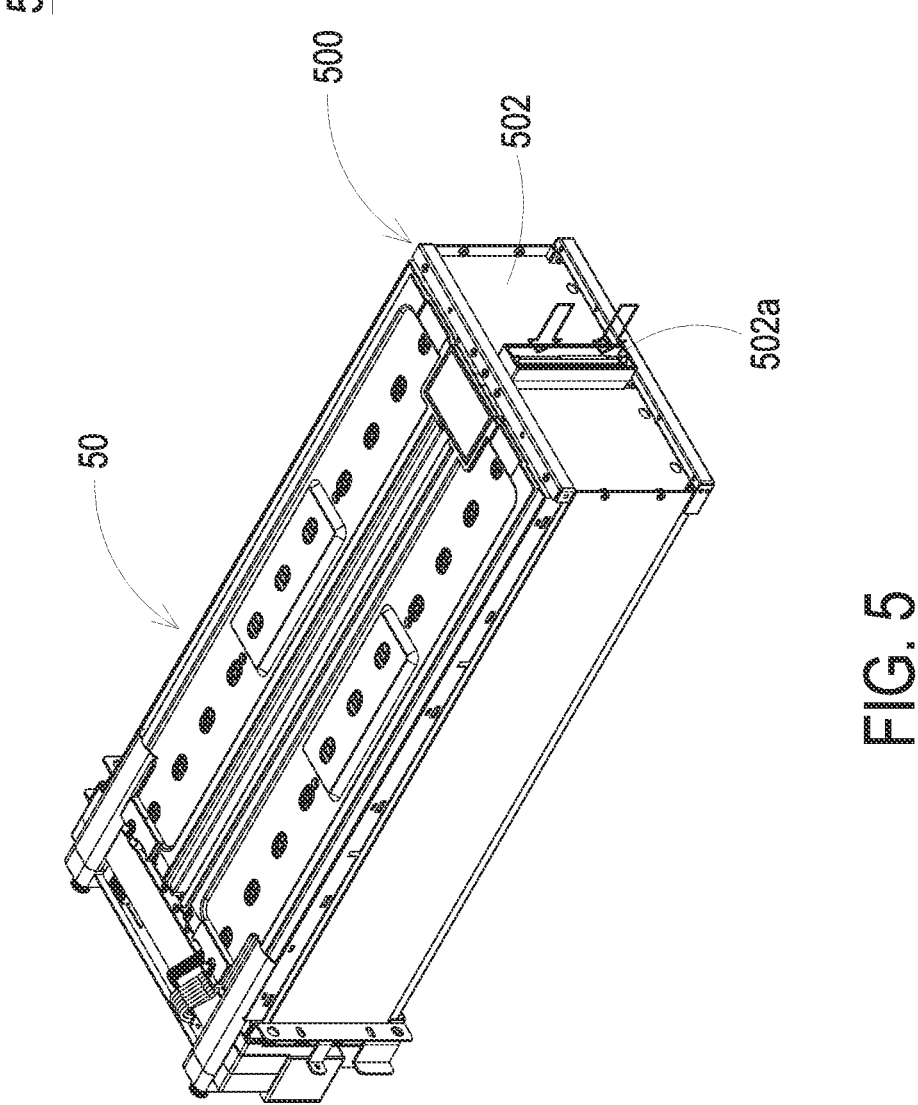
FIG. 5 is a schematic perspective view illustrating the battery module of the battery temperature control system of FIG. 1 from one angle.
Figure 6A:
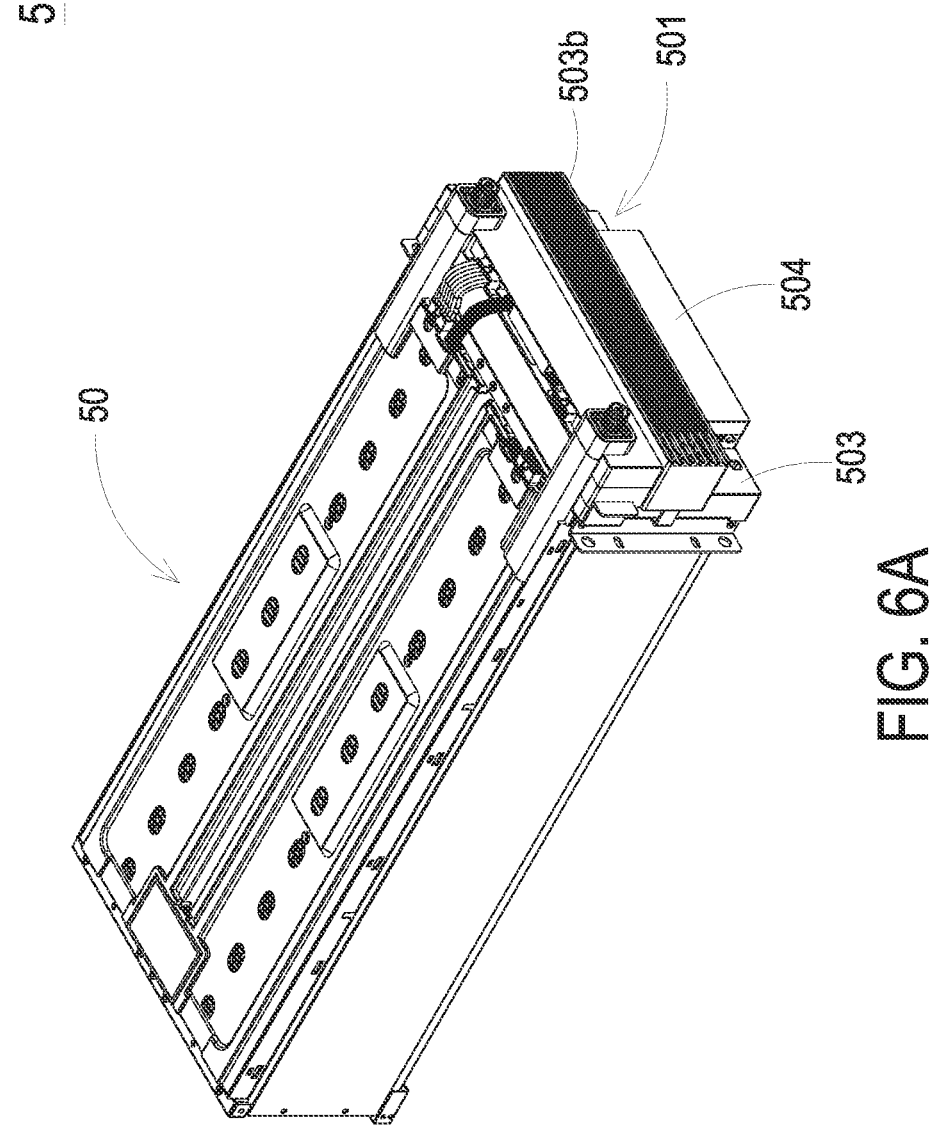
FIG. 6A is a schematic perspective view illustrating the battery module of the battery temperature control system of FIG. 5 from another angle.
Figure 6B:
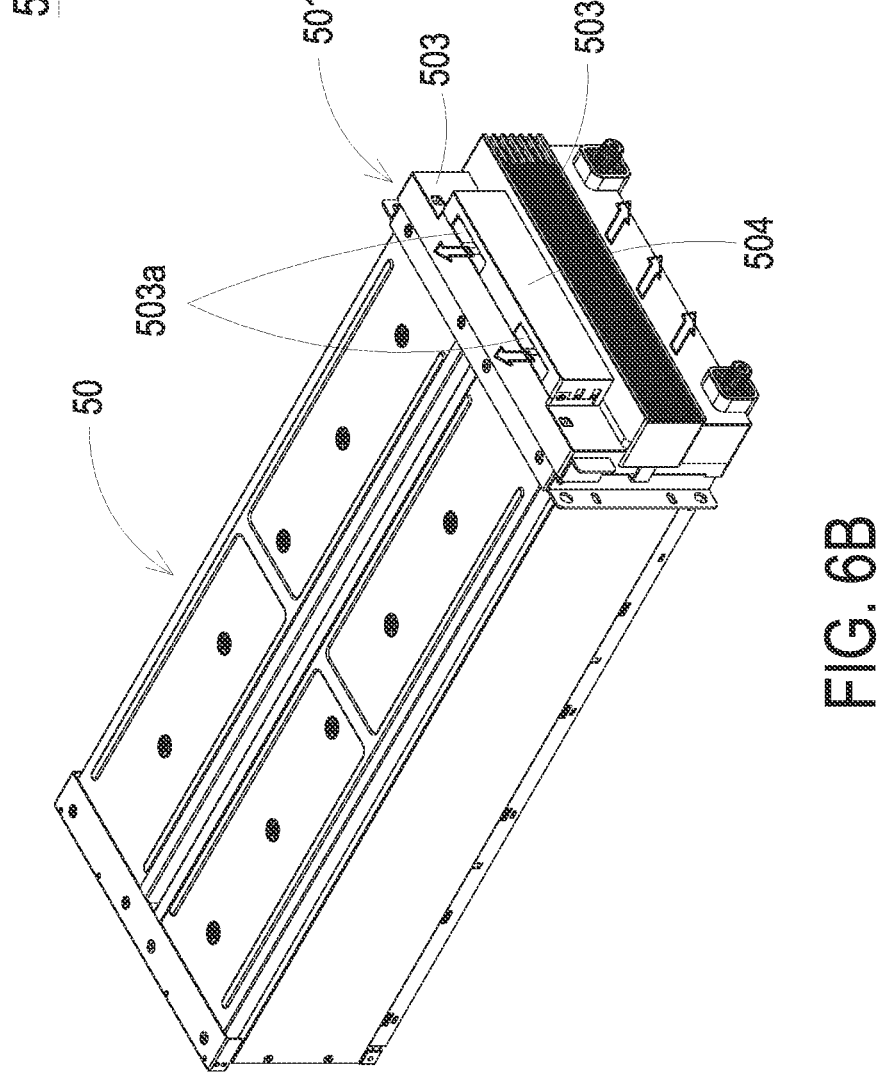
FIG. 6B is a bottom schematic perspective view illustrating the battery module of FIG. 6A.

Please refer to FIG. 4, FIG. 5, FIG. 6A and FIG. 6B. FIG. 5 is a schematic perspective view illustrating the battery module of the battery temperature control system of FIG. 1 from one angle. FIG. 6A is a schematic perspective view illustrating the battery module of the battery temperature control system of FIG. 5 from another angle. FIG. 6B is a bottom schematic perspective view illustrating the battery module of FIG. 6A. As shown in FIG. 4, each battery module 5 includes a plurality of batteries 51a, 51b, 51c, etc., a control unit 52, a fan assembly 53, a temperature detecting module 54 and a connection component 56, wherein the plurality of batteries 51a, 51b, 51c . . . are coupled with the control unit 52, the temperature detecting module 54 and the connection component 56, so as to transport power produced from the plurality of batteries 51a, 51b, 51c . . . through the connection component 56. Moreover, the fan assembly 53, the temperature detecting module 54 and the connection component 56 are also coupled with the control unit 52. In this embodiment, the temperature detecting module 54 detects the temperature of each battery 51, and then transmits the temperature information of the plurality of batteries 51a, 51b, 51c . . . to the control unit 52 to calculate and output a working temperature of the battery module 5. As mentioned above, the control unit 52 transmits the working temperature information to the central control module 4 through the connection component 56, and then receives a fan operation command from the central control module 4, so as to control the fan assembly 53 to activate the operation mode corresponding to the fan operation command. As shown in FIG. 5, each battery module 5 is constructed in a case 50, and the case 50 is received in the cabinet 2. The case 50 is a square box structure, and can be drawn out and accommodated in the cabinet 2 in a drawer type, but is not limited thereto. The case 50 has four side surfaces corresponding to each other, wherein the first side surface 502 and the second side surface 503 are respectively disposed on the first side 500 and the second side 501. The first side 500 and the second side 501 correspond to each other. When the power module 5 is accommodated in the cabinet 2, the first side 500 and the second side 501 are the front side and the rear side, respectively. Namely, the first side 500 is disposed on the front side, and is adjacent to the air conditioner 3 disposed on the door of the cabinet 2. Since the first side 500 is the front side of the cabinet 2, the second side 501 is corresponding to the rear side of the cabinet 2. As shown in FIG. 5, a first opening 502*a* is disposed on the first side surface 502 of the first side 500. In this embodiment, the first opening 502*a* can be but not limited to a hollowed-out narrow hole vertically running through the center of the first side 500 for allowing cold air or hot air to flow into the battery module 5, so as to adjust the temperature of the battery module 5. The types, arrangement and number of the first opening 502*a* are not limited thereto and are adjustable according to the practical requirements.

As shown in FIG. 6A and FIG. 6B, the second side surface 503 is disposed on the second side 501 corresponding to the first side 500. A plurality of second openings 503*a* (as shown in FIG. 6B) and a plurality of third openings 503*b* are disposed on the second side surface 503. In the embodiment, the second opening 503*a* is disposed below the extending portion 504 of the second side surface 503, and the position of the second opening 503*a* is shown as the bottom schematic perspective view of FIG. 6B. Taking the embodiment as an example, the number of the second openings 503*a* is two, and the second openings 503*a* are configured for allowing the hot air inside the battery module 5 to flow out. In the embodiment, the third openings 503*b* are fence-type opening structures transversely extending through the second side surface 503, and the position of the third openings 503*b* are corresponding to the fan assembly 53 inside, so that the fan assembly 53 can discharge the forced convection hot air to the outside of the battery module 5. Certainly, the types, arrangement and number of the second openings 503*a* and the third openings 503*b* are not limited thereto and are adjustable according to the practical requirements.

Figure 7:
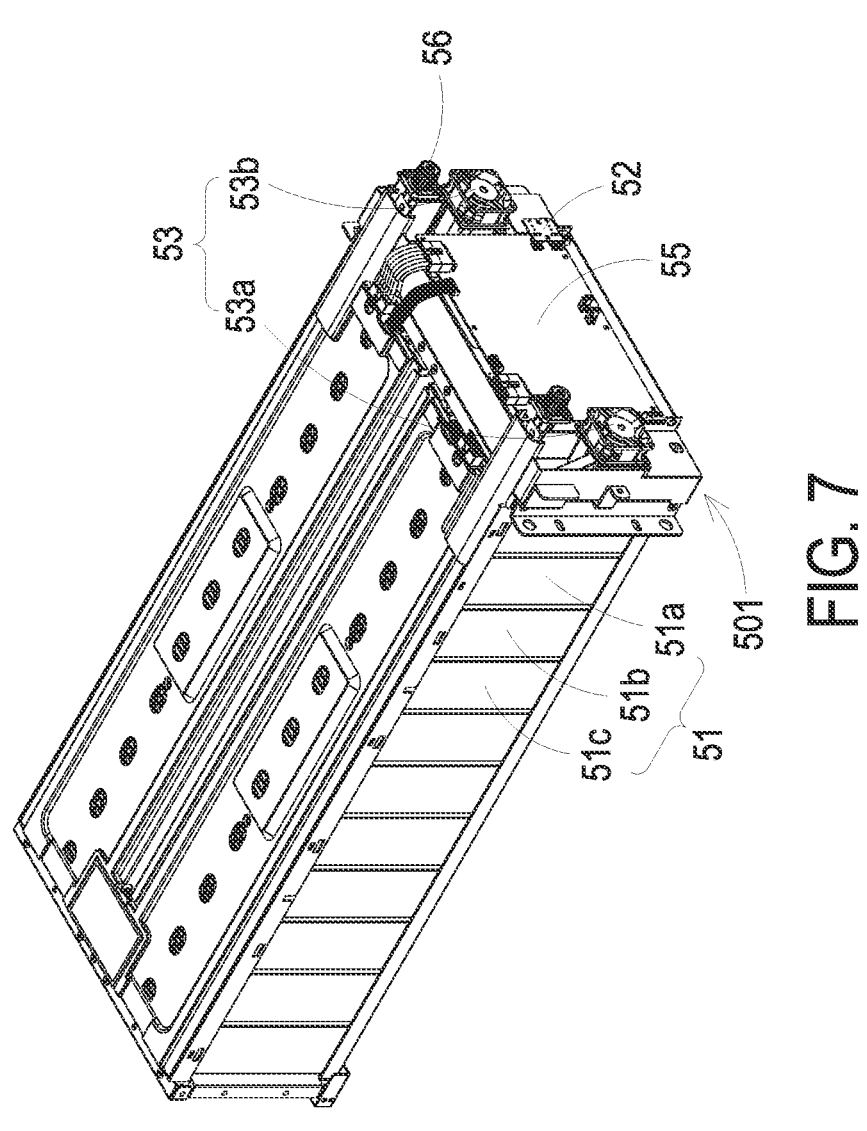
FIG. 7 is a schematic perspective view illustrating the inner structure of the battery module of FIG. 6A.

Please refer to FIG. 7. FIG. 7 is a schematic perspective view illustrating the inner structure of the battery module of FIG. 6A. As shown in FIG. 7, a plurality of batteries 51*a*, 51*b*, 51*c* . . . are disposed inside the battery module 5. The plurality of batteries 51*a*, 51*b*, 51*c* . . . are arranged side by side. Namely, in this embodiment, the battery module 5 includes two rows of batteries 51, and the number of batteries 51 in each row is 11, so that the battery module 5 of the present disclosure includes 22 batteries 51 in total, but the number of the batteries 51 can be adjusted according to the practical requirements. The fan assembly 53 is disposed at the second side 501 of the battery module 5. In the embodiment, the fan assembly 53 includes two fans 53*a* and 53*b*. The fans 53*a* and 53*b* are symmetrically arranged on the corresponding two sides of the second side 501. The positions of the fans 53*a* and 53*b* are in correspondence with the two rows of batteries 51, so as to dissipate heat of the corresponding row of the batteries 51, respectively. However, the number and positions of the fans 53*a* and 53*b* of the fan assembly 53 are not limited thereto. As shown in FIG. 7, the control unit 52 of the battery module 5 is disposed on a circuit board 55, and the circuit board 55 is correspondingly disposed between the two fans 53*a*, 53*b*, but not limited thereto. In some embodiments, the temperature detecting module 54 includes a plurality of temperature sensors (not shown), which are respectively arranged inside the case 50 and corresponding to the plurality of batteries 51*a*, 51*b*, 51*c* . . . , so as to detect and monitor the temperature of each battery 51*a*, 51*b*, 51*c* . . . of the battery module 5, and transmit the temperature information of the plurality of batteries 51*a*, 51*b*, 51*c* . . . to the control unit 52 disposed on the circuit board 55. Consequently, a working temperature of the battery module 5 can be calculated accordingly. In the embodiment, the working temperature of each battery module 5 is an average temperature of the plurality of batteries 51 of the battery module 5, which is a first average temperature. Moreover, in the present disclosure, the connection component 56 may be but not limited to a connector for transmitting signals, or an electrical connector for transmitting power, etc., so as to transmit the working temperature information monitored by the battery module 5 to the central control module 4, or transmit the power supplied by the plurality of batteries 51 of the battery module 5.

Please refer to FIG. 1, FIG. 3 and FIG. 4 at the same time. As mentioned above, the temperature detecting module 54 of each battery module 5 continuously monitors the temperature of each battery 51 through the plurality of temperature sensors, and transmits the monitoring temperature information to the control unit 52 of the battery module 5, so as to obtain the working temperature information (i.e., the first average temperature) of the battery module 5. Then, the working temperature information of each battery module 5 is transmitted to the central control module 4 through the connection component 56, and the central control module 4 compares it with a reference temperature. Consequently, a deviation value between the working temperature of each battery module 5 and the reference temperature is obtained. In the embodiment, the reference temperature is a second average temperature of the plurality of battery modules 5A, 5B, 5C, 5D. Namely, after each battery module 5A, 5B, 5C, 5D . . . respectively transmits the working temperature information (i.e., the first average temperature) monitored by the temperature detecting module 54 to the central control module 4, the core processor 41 calculates the currently average temperature of the plurality of battery modules 5A, 5B, 5C, 5D . . . , which is the second average temperature, and is used as the reference temperature for temperature regulation.

In this embodiment, the thermal management of the plurality of battery modules 5A, 5B, 5C, 5D . . . is dynamic thermal management, which is mainly based on the current working mode (cooling mode or heating mode) of the air conditioner 3 and whether the above deviation value exceeds a predetermined value, thereby conducting the thermal management of the plurality of battery modules 5A, 5B, 5C, 5D . . . , respectively. For example, if the working mode of the air conditioner 3 is a cooling mode, and the deviation value of the battery module 5A is a positive number and higher than the predetermined value, the core processor 41 of the central control module 4 transmits a high-speed operation command to the corresponding battery module 5A. In the embodiment, the tolerance range of the deviation value is below 5° C., but not limited to. In other words, if the working temperature of the battery module 5A exceeds 5° C. higher than the reference temperature, the control unit 52 of the battery module 5A controls the fan assembly 53 to activate the high-speed operation mode according to the high-speed operation command, so as to cool down the plurality of batteries 51 of the battery module 5A to reduce the working temperature of the battery module 5A. Consequently, the deviation value can be adjusted into the tolerance range of the predetermined value.

Please refer to FIG. 5 to FIG. 7 again. As mentioned above, when the fan assembly 53 of the battery module 5A executes the high-speed operation mode, the fan assembly 53 conducts the forced heat dissipation to the plurality of batteries 51 in the battery module 5A. Namely, the heat generated by the plurality of batteries 51 is rapidly transported outward from the plurality of second openings 503a and the third openings 503b on the second side surface 503 through the high-speed operation mode of the fans 53a, 53b. At the same time, the cold air provided by the cold source of the air conditioner 3 can quickly be introduced into the battery module 5A through the first opening 502a on the first side surface 502. The cold air flows through the plurality of batteries 51 in sequence to dissipate heat of the plurality of batteries 51, so as to reduce the working temperature of the battery module 5A. Moreover, the temperature detecting module 54 continuously monitors the working temperature of battery module 5A, and transmits the working temperature information to the central control module 4 through the control unit 52 of the battery module 5, so as to conduct the calculation again. If the deviation value between the working temperature of the battery module 5A and the reference temperature (i.e., the second average temperature) falls within the predetermined value (i.e., 5° C.) after the above-mentioned temperature control procedure, the central control module 4 transmits the medium-speed operation command to the battery module 5A. After the control unit 52 of the battery module 5A receives the medium-speed operation command, the control unit 52 transmits the medium-speed operation command to the fan assembly 53 to activate the corresponding medium-speed operation mode. Consequently, the rotational speeds of the fans 53a, 53b are reduced to a medium speed to slow down the speed of transporting cold air into the battery module 5A. Consequently, the cooling speed of the battery module 5A is slowed down, and the working temperature is maintained.

On the contrary, if the air conditioner 3 is a cooling mode, and the deviation value is a negative number and higher than the predetermined value (5° C.), it means that the deviation value between the working temperature of the battery module 5A and the reference temperature (i.e., the second average temperature) already exceeds over the predetermined value (i.e., 5° C.). Namely, the working temperature of the battery module 5A exceeds 5° C. lower than the reference temperature, and the central control module 4 transmits the low-speed operation command to the battery module 5A, so that the control unit 52 transmits the low-speed operation command to the fan assembly 53 to activate the corresponding low-speed operation mode. Consequently, the rotational speeds of the fans 53a, 53b are reduced to a low speed, and the cold air is transported into the battery module 5A in a small amount to reduce the cooling capacity.

In another embodiment, when the working mode of the air conditioner 3 is a heating mode, the hot air is outputted by the air conditioner 3, and the deviation value of the battery module 5B is a positive number and higher than the predetermined value (5° C.), the core processor 41 of the central control module 4 transmits the low-speed operation command to the corresponding battery module 5B. The control unit 52 of battery module 5B controls the fan assembly 53 to activate the corresponding low-speed operation mode according to the low-speed operation command. Consequently, the rotational speeds of the fans 53a, 53b are reduced to the low speed, and the hot air is transported into the battery module 5B in a small amount to decrease the heating efficiency. If the deviation value of the battery module 5B is a negative number and higher than the predetermined value (5° C.), which means the working temperature of the battery module 5B exceeds 5° C. lower than the reference temperature (the second average temperature), the central control module 4 transmits the high-speed operation command to the corresponding battery module 5B, so that the control unit 52 transmits the high-speed operation command to the fan assembly 53 to activate the corresponding high-speed operation mode. Consequently, the rotational speeds of the fans 53a, 53b are increased to a high speed, and the hot air is largely and rapidly transported into the battery module 5B, so as to heat up the plurality of batteries 51 of the battery module 5B to raise the working temperature of the battery module 5B. Consequently, the deviation value is adjusted into the tolerance range of the predetermined value.

As mentioned above, if the working mode of the air conditioner 3 is a heating mode, and the deviation value between the working temperature of the battery module 5B and the reference temperature (i.e., the second average temperature) falls within the predetermined value (i.e., 5° C.), it means that the working temperature of the battery module 5B falls within the tolerance range of the second average temperature. Consequently, the central control module 4 transmits the medium-speed operation command to the battery module 5B, wherein the fan assembly 53 of the battery module 5B can activate the corresponding medium-speed operation mode, so as to slow down the speed of transporting hot air into the battery module 5B, thereby slowing down the heating speed of the battery module 5B and maintaining the working temperature of the battery module 5B.

Accordingly, in the present disclosure, the thermal management of the plurality of battery modules 5A, 5B, 5C, 5D . . . is a dynamic thermal management. Through the temperature management to the battery modules 5A, 5B, etc. whose working temperature is divergent (that is, the deviation value is greater than a predetermined value) by the central control module 4 at any time, the different fan operation command is sent to the fan assembly 53 of the corresponding battery modules 5A, 5B, etc. to perform different fan speed adjustments. Together with the working mode provided by the air conditioner 3, the working temperature of the battery modules 5A, 5B can be lowered or raised, and the working temperature of the battery modules 5A, 5B can be brought back to the average value, so as to maintain the temperature consistency of the battery modules 5A, 5B, 5C, 5D, etc. Meanwhile, the temperature uniformity of the plurality of batteries 51 in each battery module 5 is improved, thereby effectively prolonging the service life of the batteries 51 and preventing the loss of the total electric capacity.

From the above descriptions, the present disclosure provides a battery temperature control system, wherein the central control module sends a temperature controlling command to the air conditioner to activate a cold source or a heat source according to an ambient temperature. Then the central control module compares and calculates the working temperature information transmitted from the plurality of battery modules of a cabinet, and sends a fan operation command to each corresponding battery module. The fan assembly of each corresponding battery module activates an operation mode to cool down or heat up the plurality of batteries of the corresponding battery module, so as to adjust the working temperature of each battery module to achieve a dynamic temperature balance. Consequently, the cooling efficiency or heating efficiency of each battery module of the cabinet is increased, the temperature uniformity of the plurality of batteries is improved, the service life of the batteries is effectively prolonged, the loss of the total electric capacity is prevented, and the product reliability is also increased.

While the disclosure has been described in terms of what is presently considered to be the most practical and preferred embodiments, it is to be understood that the disclosure needs not be limited to the disclosed embodiment.

What is claimed is:

1. A battery temperature control system, comprising:
a cabinet;
an air conditioner disposed in the cabinet for providing a cold source or a heat source;
a central control module disposed in the cabinet and coupled with the air conditioner; and
a plurality of battery modules coupled with the central control module, wherein each of the plurality of battery modules comprises a plurality of batteries, a control unit, a fan assembly and a temperature detecting module, the plurality of batteries, the fan assembly and the temperature detecting module are coupled with the control unit, and each battery module is constructed in a case, the case is received in the cabinet, and the temperature detecting module of each battery module detects and monitors a working temperature of the corresponding battery module continuously, and sends a working temperature information to the central control module;
wherein the central control module sends a temperature controlling command to the air conditioner to activate the cold source or the heat source according to an ambient temperature, then the central control module compares and calculates the working temperature information transmitted from the plurality of battery modules with a reference temperature to calculate a deviation value of each battery module, and sends a fan operation command to the corresponding battery module, wherein the fan operation command is a high-speed operation command, a medium-speed operation command, or a low-speed operation command, and the corresponding fan assembly activates an operation mode of a high-speed operation mode, a medium-speed operation mode or a low-speed operation mode to cool down or heat up the corresponding battery module, so as to adjust the working temperature of each battery module to achieve a dynamic temperature balance.

2. The battery temperature control system according to claim 1, wherein the air conditioner comprises a cooling module and a heating module for respectively providing the cold source and the heat source, and outputting a cold air and a hot air.

3. The battery temperature control system according to claim 2, wherein the temperature controlling command comprises a first temperature controlling command and a second temperature controlling command, when the ambient temperature is determined as in a high temperature state, the central control module sends the first temperature controlling command to the air conditioner to activate the cooling module, so as to provide the cold source and output the cold air; when the ambient temperature is determined as in a low temperature state, the central control module sends the second temperature controlling command to the air conditioner to activate the heating module, so as to provide the heat source and output the hot air.

4. The battery temperature control system according to claim 1, wherein the working temperature of each battery module is a first average temperature of the plurality of batteries of the battery module.

5. The battery temperature control system according to claim 1, wherein the central control module sends the fan operation command to the each corresponding battery module according to a working mode of the air conditioner and whether the deviation value exceeds a predetermined value, so that the fan assembly activates the operation mode to cool down or heat up the corresponding battery module to adjust the working temperature of each battery module.

6. The battery temperature control system according to claim 1, wherein the reference temperature is a second average temperature of the plurality of battery module.

7. The battery temperature control system according to claim 5, wherein when the working mode of the air conditioner is a cooling mode, and the deviation value is a positive number and higher than the predetermined value, the central control module will transmit the high-speed operation command to the corresponding battery module, and the fan assembly will correspondingly activate the high-speed operation mode, so as to cool down the plurality of batteries of the battery module to reduce the working temperature of the battery module.

8. The battery temperature control system according to claim 5, wherein when the working mode of the air conditioner is a cooling mode, and the deviation value is a negative number and higher than the predetermined value, the central control module will transmit the low-speed operation command to the corresponding battery module, and the fan assembly will correspondingly activate the low-speed operation mode, so as to decrease the cooling efficiency.

9. The battery temperature control system according to claim 5, wherein when the deviation value is lower than the predetermined value, the central control module will transmit the medium-speed operation command to the corresponding battery module, and the fan assembly will correspondingly activate the medium-speed operation mode, so as to maintain the working temperature of the battery module.

10. The battery temperature control system according to claim 5, wherein when the working mode of the air conditioner is a heating mode, and the deviation value is a positive number and higher than the predetermined value, the central control module will transmit the low-speed operation command to the corresponding battery module, and the fan assembly will correspondingly activate the low-speed operation mode, so as to decrease the heating efficiency.

11. The battery temperature control system according to claim 5, wherein when the working mode of the air conditioner is a heating mode, and the deviation value is a negative number and higher than the predetermined value, the central control module will transmit the high-speed operation command to the corresponding battery module, and the fan assembly will correspondingly activate the high-speed operation mode, so as to heat up the plurality of batteries of the battery module to increase the working temperature of the battery module.

* * * * *